(12) United States Patent
Ramesh et al.

(10) Patent No.: US 7,644,076 B1
(45) Date of Patent: Jan. 5, 2010

(54) CLUSTERING STRINGS USING N-GRAMS

(75) Inventors: Bhashyam Ramesh, San Diego, CA (US); Michael W. Watzke, Madison, WI (US)

(73) Assignee: Teradata US, Inc., Miamisburg, OH (US)

( * ) Notice: Subject to any disclaimer, the term of this patent is extended or adjusted under 35 U.S.C. 154(b) by 0 days.

(21) Appl. No.: 10/661,245

(22) Filed: Sep. 12, 2003

(51) Int. Cl.
G06F 17/30 (2006.01)
(52) U.S. Cl. .................................. 707/6; 707/3; 707/4
(58) Field of Classification Search ................. 707/101, 707/3, 4, 5, 6, 102; 704/9, 7
See application file for complete search history.

(56) References Cited

U.S. PATENT DOCUMENTS

| | | | |
|---|---|---|---|
| 5,293,584 A * | 3/1994 | Brown et al. ................. 704/277 |
| 5,418,951 A * | 5/1995 | Damashek ...................... 707/5 |
| 5,706,365 A * | 1/1998 | Rangarajan et al. ......... 707/102 |
| 5,724,593 A * | 3/1998 | Hargrave et al. ............... 704/7 |
| 5,991,714 A * | 11/1999 | Shaner ......................... 704/9 |
| 6,006,221 A * | 12/1999 | Liddy et al. .................... 707/5 |
| 6,009,392 A * | 12/1999 | Kanevsky et al. ........... 704/245 |
| 6,131,082 A * | 10/2000 | Hargrave et al. ............... 704/7 |
| 6,578,032 B1 * | 6/2003 | Chandrasekar et al. ......... 707/6 |
| 6,581,057 B1 * | 6/2003 | Witbrock et al. ............... 707/5 |
| 6,725,426 B1 * | 4/2004 | Pavlov ........................ 715/523 |
| 6,820,075 B2 * | 11/2004 | Shanahan et al. ............... 707/3 |
| 6,862,586 B1 * | 3/2005 | Kreulen et al. ................. 707/3 |
| 6,978,419 B1 * | 12/2005 | Kantrowitz .................. 715/209 |
| 7,254,774 B2 * | 8/2007 | Cucerzan et al. ............ 715/533 |
| 7,284,009 B2 * | 10/2007 | Perrow ....................... 707/102 |
| 7,519,590 B2 * | 4/2009 | Chandrasekar et al. ......... 707/6 |
| 2003/0200198 A1 * | 10/2003 | Chandrasekar et al. ......... 707/1 |
| 2004/0117380 A1 * | 6/2004 | Perrow ....................... 707/100 |

OTHER PUBLICATIONS

Mauricio A. Hernández, Salvatore J. Stolfo; The Merge/Purge Problem for Large Databases; Proceedings of the 1995 ACM SIGMOD International Conference on Management of Data, 1995.
Michael Steinbach, George Karypis, Vipin Kumar; A Comparison of Document Clustering Techniques; University of Minnesota Technical Report #00-034; pp. 1-20, May 23, 2000.

* cited by examiner

*Primary Examiner*—Jean M Corrielus
(74) *Attorney, Agent, or Firm*—Howard Speight

(57) ABSTRACT

A method and computer program for clustering a string are described. The string includes a plurality of characters. R unique n-grams $T_{1 \ldots R}$ are identified in the string. For every unique n-gram $T_S$, if the frequency of $T_S$ in a set of n-gram statistics is not greater than a first threshold, the string is associated with a cluster associated with $T_S$. Otherwise, for every other n-gram $T_V$ in the string $T_{1 \ldots R, \text{ except } S}$, if the frequency of n-gram $T_V$ is greater than the first threshold, and if the frequency of n-gram pair $T_S$-$T_V$ is not greater than a second threshold, the string is associated with a cluster associated with the n-gram pair $T_S$-$T_V$. Otherwise, for every other n-gram $T_X$ in the string $T_{1 \ldots R, \text{ except } S \text{ and } V}$, the string is associated with a cluster associated with the n-gram triple $T_S$-$T_V$-$T_X$. Otherwise, nothing is done.

7 Claims, 11 Drawing Sheets

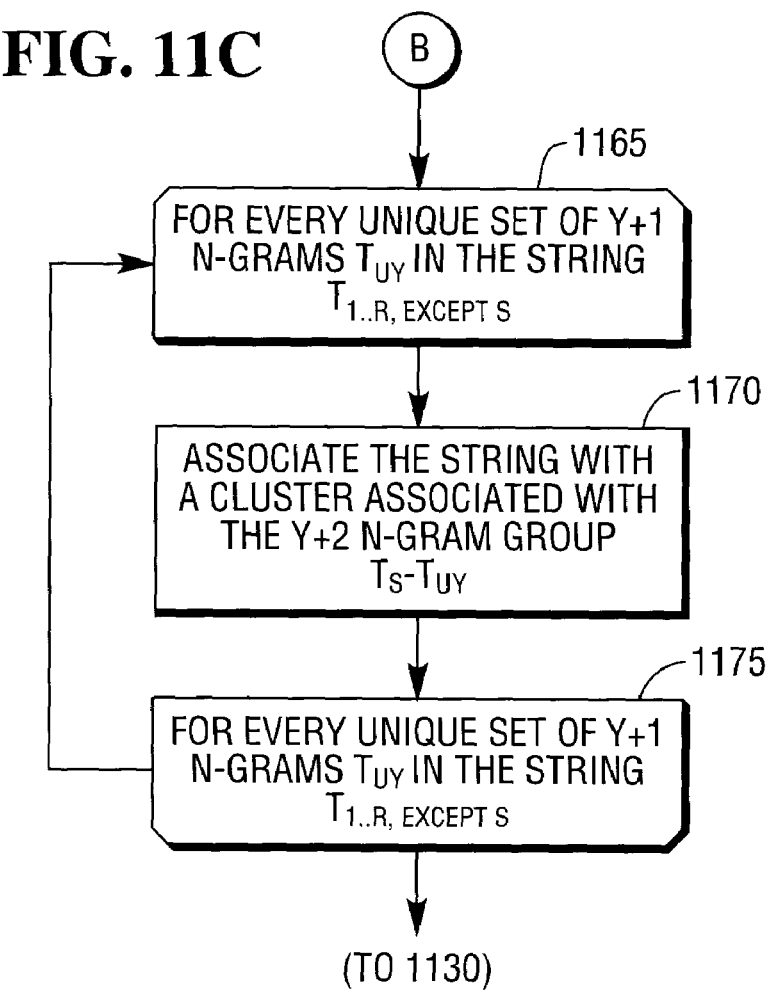

CLUSTERING STRINGS USING N-GRAMS

BACKGROUND

A growing application for relational database systems is a data warehouse which stores a vast quantity of data concerning, for example, a company's ongoing operations. Many data warehouse implementations integrate information from a number of sources. Because more than one data source is involved, the system may receive inconsistent and/or incorrect data. Existing systems execute a transformation process to correct the errors or make the data consistent. Part of this transformation process includes identifying and eliminating duplicate records and linking records into common groups. For example, a system may group records associated with a particular household. Typically, similar records are identified based on fuzzy matching to address issues such as data entry errors or phonetic errors.

Clustering is a common technique used to partition a data set to reduce the complexity cost of comparing data set records and/or to support partitioned execution. One known clustering technique, known as probabilistic clustering, is based on the concept of evaluating multiple iterations of exact matching on fields in the input records. Results from the multiple runs are combined to identify duplicates or groups. Examples of this technique include the sorted moving window algorithm. Another clustering technique, known as the feature vector approach, is based on mapping the input string to an N dimensional vector. The vector represents the frequency of each word token in the string. Similarity is then defined as the proximity of feature vectors in feature space. A common similarity measure is the cosines measure. The feature vector approach has typically been applied to the problem of clustering documents which include many tokens.

An example fuzzy matching algorithm provides a mechanism to efficiently cluster strings into partitions of potentially similar strings. The records within each partition can then be compared using a more exhaustive similarity measure. Examples of similarity measures include:

A. Pattern similarity—n-grams (i.e., substrings of length n within the string), are the most common measure. n-gram similarity is based on the concept that strings with common n-grams can be considered similar.

B. Data entry similarity—Edit distance is the most common measure. Edit distance counts the insertions, deletions, substitutions and transpositions needed to transform one string into another.

C. Phonetic similarity—Strings are compared to determine their phonetic (speech sound) similarity.

SUMMARY

In general, in one aspect, the invention features a method for clustering a string. The string includes a plurality of characters. The method includes identifying R unique n-grams $T_1 \ldots _R$ in the string. For every unique n-gram $T_S$, if the frequency of $T_S$ in a set of n-gram statistics is not greater than a first threshold, the method includes associating the string with a cluster associated with $T_S$. Otherwise, for every other n-gram $T_V$ in the string $T_{1 \ldots R, except\ S}$, if the frequency of n-gram $T_V$ is greater than the first threshold, and if the frequency of n-gram pair $T_S$-$T_V$ is not greater than a second threshold, the method includes associating the string with a cluster associated with the n-gram pair $T_S$-$T_V$. Otherwise, for every other n-gram $T_X$ in the string $T_{1 \ldots R, except\ S\ and\ V}$, the method includes associating the string with a cluster associated with the n-gram triple $T_S$-$T_V$-$T_X$. Otherwise, nothing is done.

Implementations of the invention may include one or more of the following. The method may include compiling n-gram statistics. The method may include compiling n-gram pair statistics.

In general, in another aspect, the invention features a method for clustering a plurality of strings. Each string includes a plurality of characters. The method includes identifying unique n-grams in each string, associating each string with clusters associated with low frequency n-grams from that string, if any, and associating each string with clusters associated with low-frequency pairs of high frequency n-grams from that string, if any.

Implementations of the invention may include one or more of the following. Where a string does not include any low-frequency pairs of high frequency n-grams, the method may include associating that string with clusters associated with triples of n-grams including the pair.

In general, in another aspect, the invention features a method for clustering a string. The string includes a plurality of characters. The method includes identifying R unique n-grams $T_1 \ldots _R$ in the string. For every unique n-gram $T_S$, if the frequency of $T_S$ in a set of n-gram statistics is not greater than a first threshold, the method includes associating the string with a cluster associated with $T_S$. Otherwise, for i=1 to Y, for every unique set of i n-grams $T_U$ in the string $T_{1 \ldots R, except\ S}$, if the frequency of the n-gram set $T_S$-$T_U$ is not greater than a second threshold, the method includes associating the string with a cluster associated with the n-gram set $T_S$-$T_U$. If the string has not been associated with a cluster with this value of $T_S$, for every unique set of Y+1 n-grams $T_{UY}$ in the string $T_{1 \ldots R, except\ S}$, the method includes associating the string with a cluster associated with the Y+2 n-gram group $T_S$-$T_{UY}$.

Implementations of the invention may include one or more of the following. Y may be set to 1. The method may include compiling n-gram statistics. The method may include compiling n-gram group statistics.

In general, in another aspect, the invention features a computer program, stored on a tangible storage medium, for use in clustering a string. The program includes executable instructions that cause a computer to identify R unique n-grams $T_1 \ldots _R$ in the string. For every unique n-gram $T_S$, if the frequency of $T_S$ in a set of n-gram statistics is not greater than a first threshold, the program associates the string with a cluster associated with $T_S$. Otherwise, for every other n-gram $T_V$ in the string $T_{1 \ldots R, except\ S}$, if the frequency of n-gram $T_V$ is greater than the first threshold, and if the frequency of n-gram pair $T_S$-$T_V$ is not greater than a second threshold, the program associates the string with a cluster associated with the n-gram pair $T_S$-$T_V$. Otherwise, for every other n-gram $T_X$ in the string $T_{1 \ldots R, except\ S\ and\ V}$, the program associates the string with a cluster associated with the n-gram triple $T_S$-$T_V$-$T_X$. Otherwise, the program does nothing.

Implementations of the invention may include one or more of the following. The computer program may include executable instructions that cause a computer to compile n-gram statistics. The computer program may include executable instructions that cause a computer to compile n-gram pair statistics.

BRIEF DESCRIPTION OF THE DRAWINGS

FIGS. 6A, 6B, 10A, 10B, 11A, 11B, and 11C are flowcharts.

DETAILED DESCRIPTION

Figure 1:
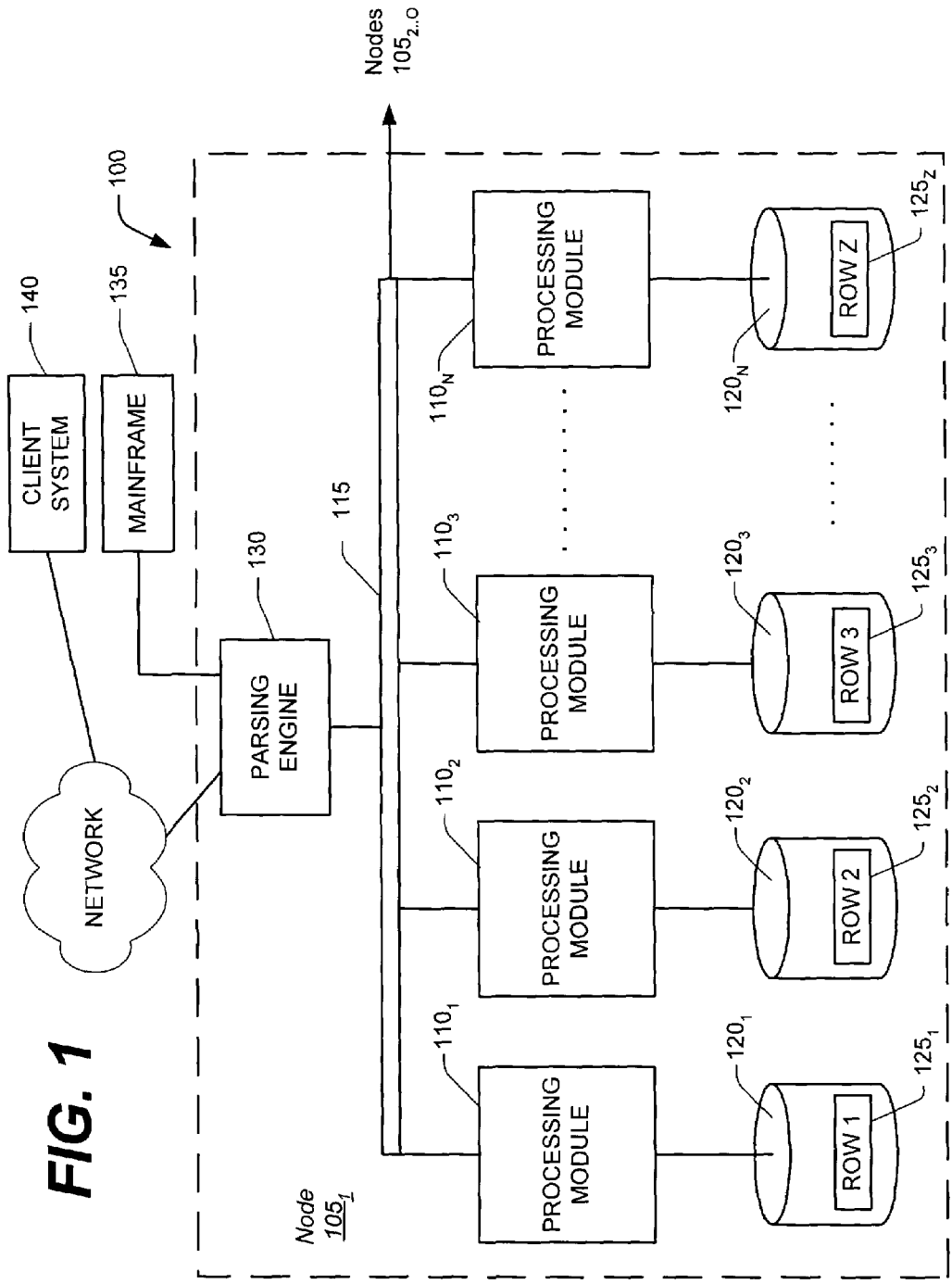
FIG. 1 is a block diagram of a node of a database system.

The string clustering technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node 1051, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
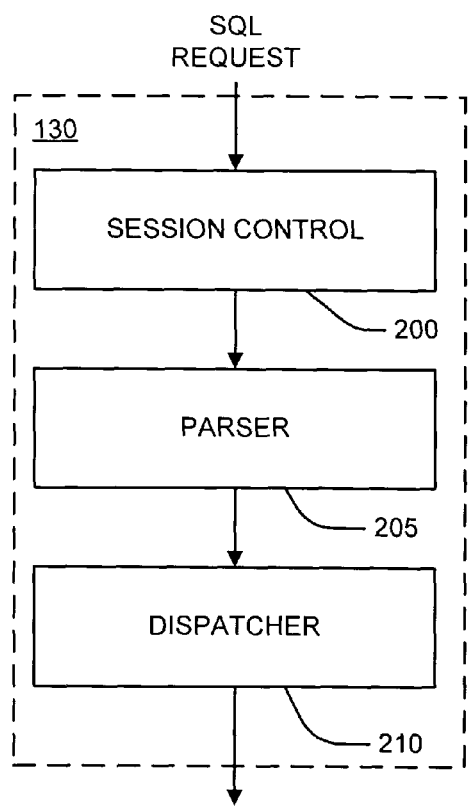
FIGS. 2-4 are a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
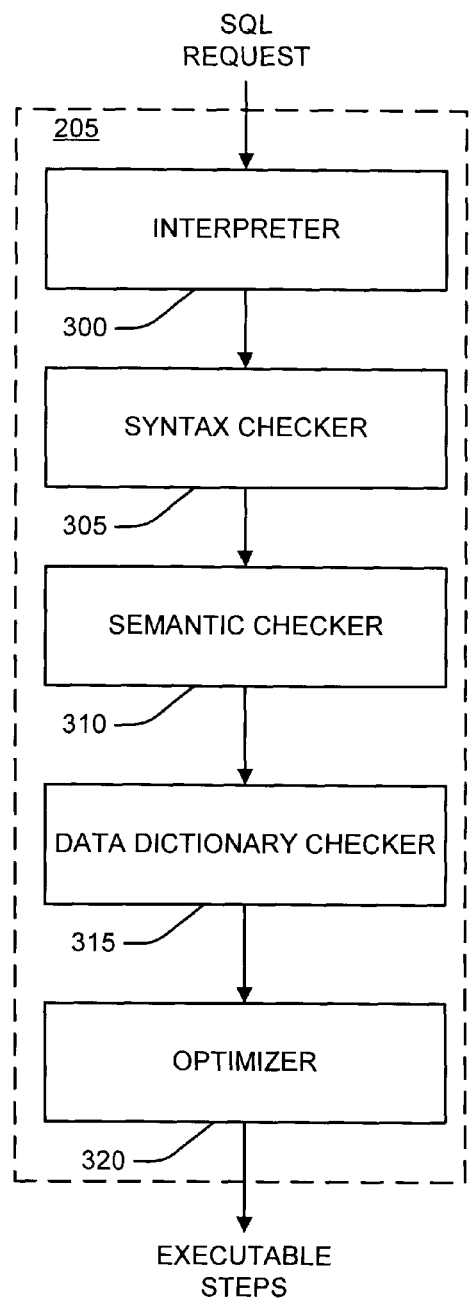

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
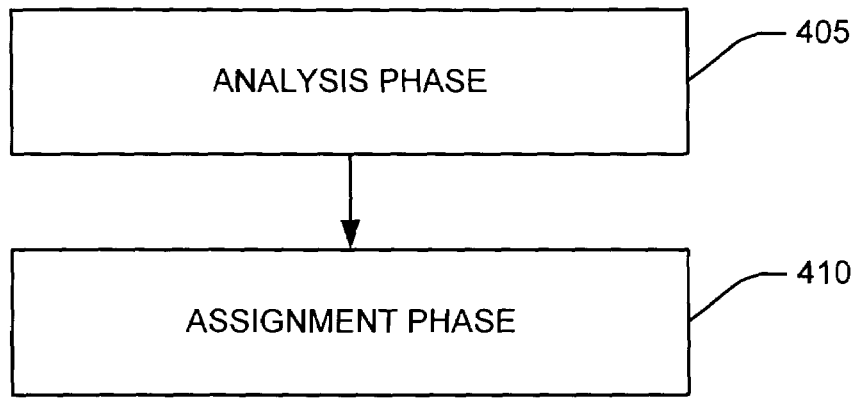

A string clustering technique includes two phases, as shown in FIG. 4: an analysis phase 405 and an assignment phase 410. The technique guarantees that strings with three or more equivalent n-grams will be assigned to the same cluster. In cases where the n-gram pairs are infrequent, it guarantees that strings with two or more equivalent n-grams will be assigned to the same cluster. In the case when the n-gram is infrequent, it guarantees that strings with one or more equivalent n-grams will be assigned to the same cluster. The algorithm is adaptive in that it applies more weight to infrequent patterns, which are more discriminating.

The technique guarantees that strings with three or more n-gram matches will be assigned to the same cluster by assigning a string to a cluster associated with an n-gram triplet if no other assignment is made. For example, assume we have the strings:

Mike which has n-grams Mi ik ke.

Bike which has n-grams Bi ik ke.

Assume all of the n-grams and n-gram pairs are very frequent. The techniques would not be assign the string to any of the associated n-gram clusters or n-gram pair clusters. In that case, the technique would generate n-gram triplets of the "mi,ik,ke", and "bi,ik,ke," which would not match because only two n-grams are in common. If the n-gram triplets of the two strings had matched, they would be matched to the same cluster. For example "Mike" and "Mikes" would have matching n-gram triplets and would be assigned to the same cluster.

The technique allows the n-gram size to be varied as a function of the typical input string length. Longer strings may require longer n-grams. In the case of personnel names, a bi-gram is a good candidate size.

The n-gram pairing can be increased beyond three to handle highly skewed patterns. For example, a system may require that four n-grams match before a guaranteed assignment to a n-gram quartet cluster is made.

Figure 5:
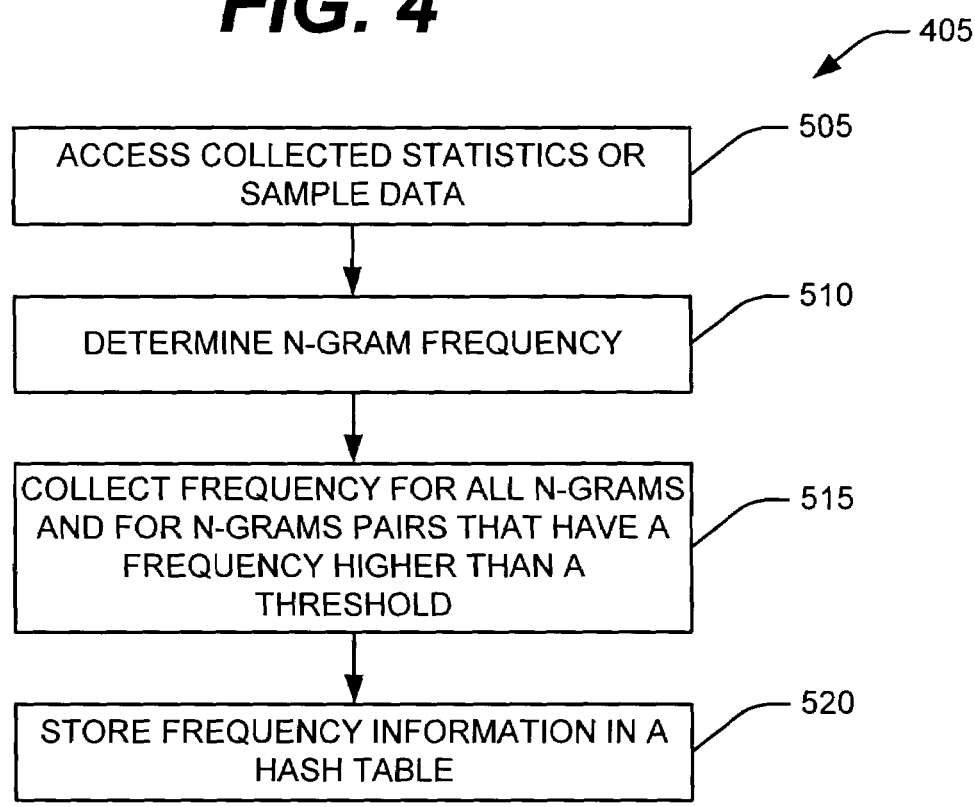
FIG. 5 is a flowchart.

The analysis phase (block 405), illustrated in more detail in FIG. 5, begins by accessing collected statistics or sample data (block 505) to determine n-gram frequency (block 510). N-gram frequency is defined as the count of the n-gram occurrence divided by the total string count. For example, if an n-gram occurs two times in ten strings, then the frequency is 2/10=0.2. The technique then collects frequency information for all n-grams and n-gram pairs that have a frequency higher than a given threshold, for example, HIGH (block 515). The frequency information is stored in a hash table to support fast look up during the analysis phase (block 520).

Figure 6A:
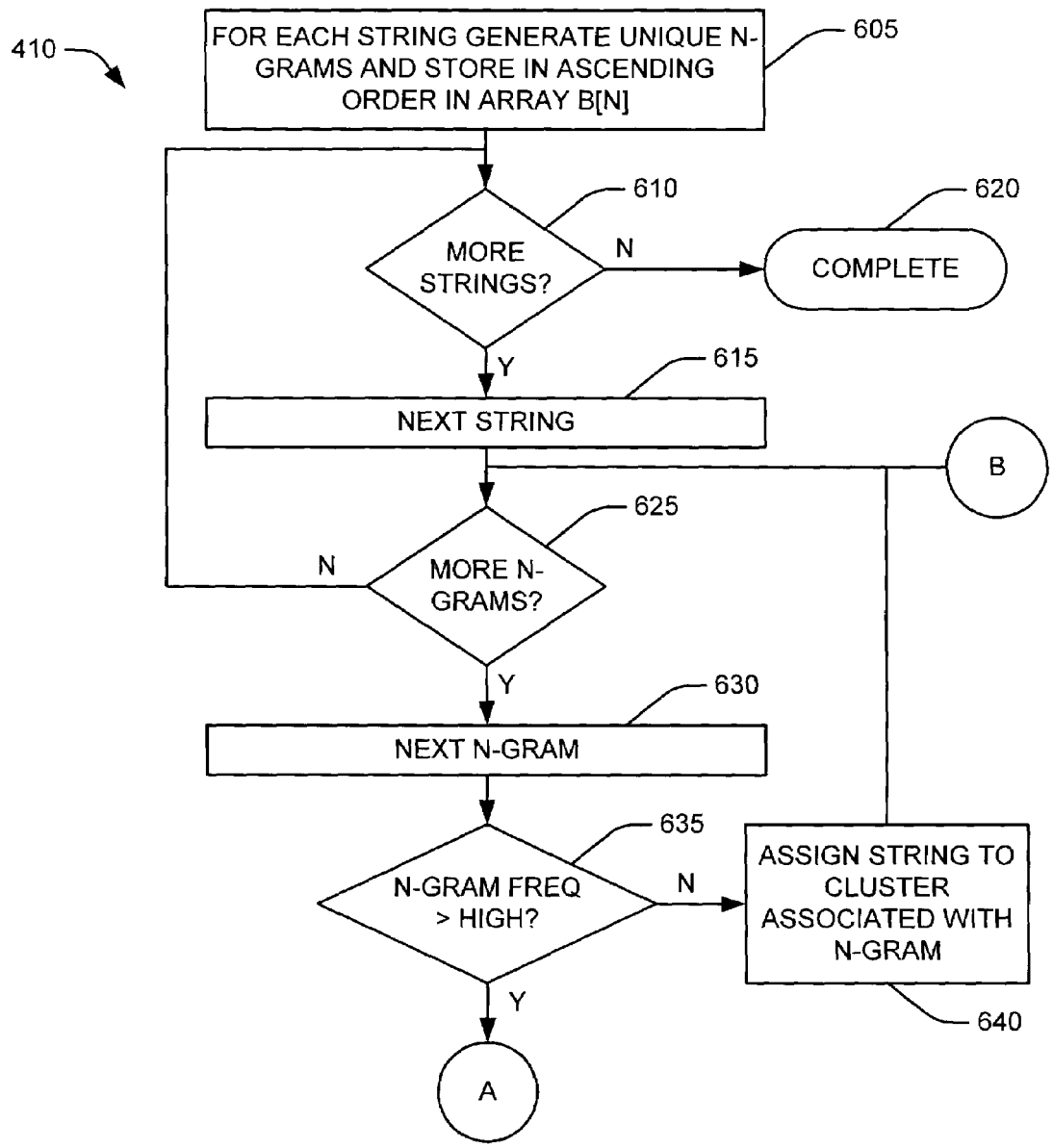
Figure 6B:
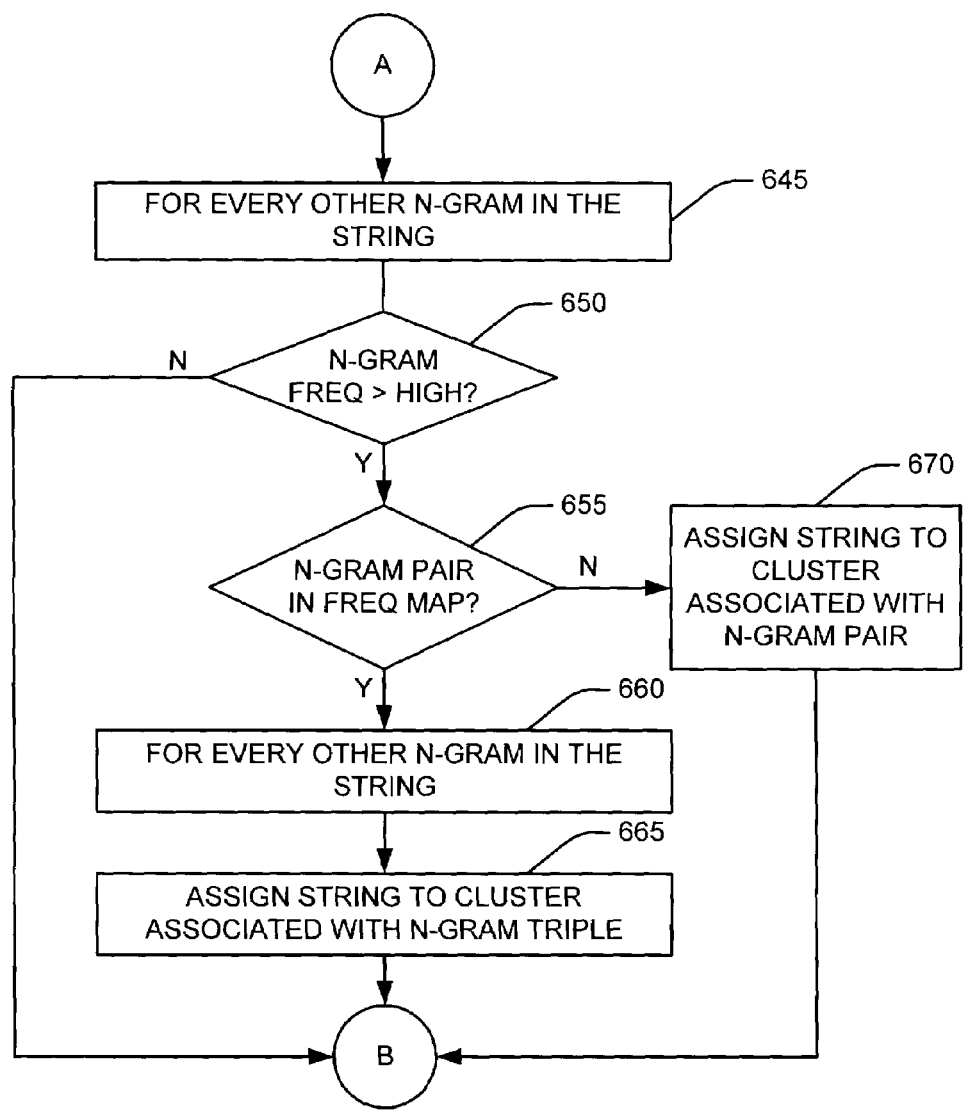

The assignment phase (block 410), illustrated in FIGS. 6A and 6B is described in the following pseudo-code:

---

For each string generate unique n-grams and store in ascending order in array B[N] (blocks 605, 610, 615 and 620).

For (i=0; i < N; i++) (blocks 625 and 630)  //N is the number of unique n-grams in the string -continued

```
If (B[i] frequency is NOT HIGH) (block 635)
    Assign string to B[i] cluster (block 640) // This implies the n-
       gram is not common
Else
    For (j=0; j < N AND i != j; j++) (block 645) //pair Bi with all
       other n-grams in string
       If (B[j] frequency is HIGH) (block 650)
    {
If (B[i],B[j] in frequency map) (block 655) // pair is
skewed
For (k=0; k < N AND (k != i,j; k++) (block 660) //pair
B1,B2 with all other n-grams in string
    Assign string to B[i],B[j],B[k] cluster (block 665)
Else
    Assign string to B[i],B[j] cluster (block 670)
    }
Else noop // Do not pair high-frequency frequency n-grams with
low frequency n-grams
```

The noop statement (the last statement in the above pseudo-code) insures that the algorithm does not pair high frequency n-grams with low frequency n-grams, which helps to reduce the string expansion factor. Strings with such pairs will match in low frequency n-gram clusters.

This approach reduces execution complexity from $O(A^2)$ for a simple comparison technique to $O(wA)$, where A is the number of strings in the input set and w is a constant dependent average cluster size. Further, the above-described clustering technique is deterministic and can guarantee an error tolerance. The technique also does not require a transitive closure operation because there are not multiple iterations. The technique minimizes duplication by not paring high frequency n-grams with low frequency n-grams and only processing unique n-grams in the string. The technique minimizes skew by adapting partitioning buckets to n-gram frequency, bi-gram pairs and bi-gram triplets. Further, the technique can execute in a shared nothing architecture.

Figure 7:
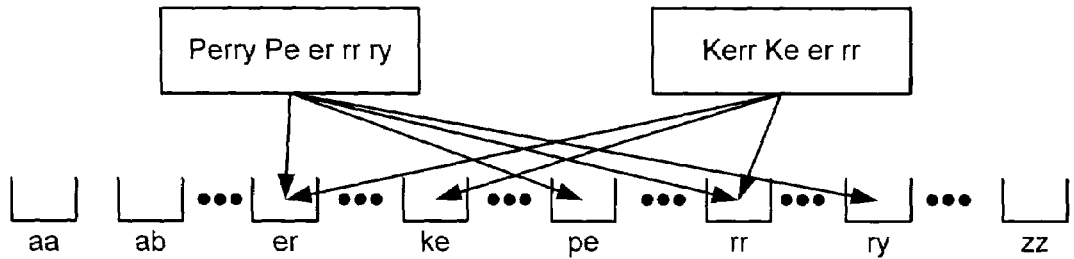
FIGS. 7-9 illustrate associating strings with clusters.
Figure 8:
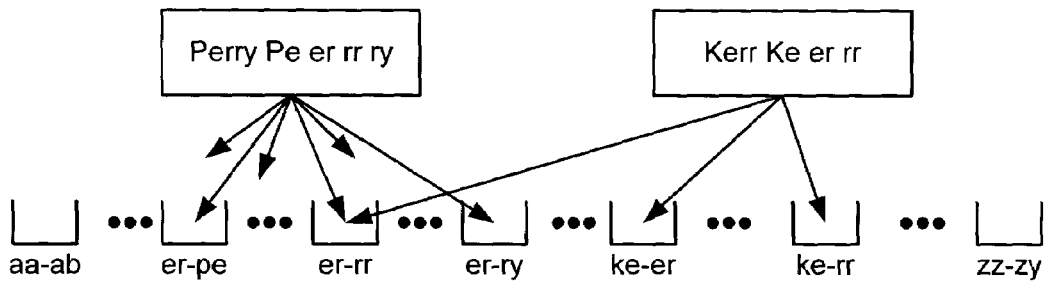
Figure 9:
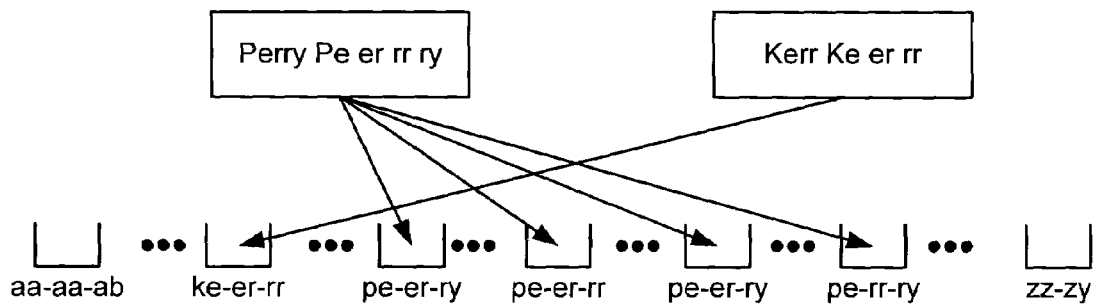

An application of this algorithm to the names "Perry" and "Kerr", illustrated in FIGS. 7, 8, and 9, shows that if the cluster assignments are based only on bi-grams, as shown in FIG. 7, the two names are commonly assigned to two clusters, the "er" cluster and the "rr" cluster, but only if those n-grams have a frequency below the threshold. The number of clusters to which both words are assigned is reduced to one, the "er-rr" cluster, when bi-gram pairs are considered, as shown in FIG. 8 (note that not all of the bi-gram pair clusters are shown; for example, "Perry" would be assigned to the pe-rr cluster, which is not shown). Again, this assignment only occurs if the frequency of "er,rr" is below the threshold. Finally, the lack of similarity between the names "Perry" and "Kerr" is revealed when bi-gram triples are used, as shown in FIG. 9. In FIG. 9 the two names do not map to any common clusters.

The following table, Table 1, shows a possible SQL implementation flow for the string clustering technique described above. An example RELATED syntax is shown which uses the string clustering technique to find stored strings that fall into the same cluster or clusters as the argument for the RELATED expression.

TABLE 1

| # | Description | Item |
|---|---|---|
| 1 | User Query Syntax | CREATE TABLE customer (cid INTGER ,firstname VARCHAR(30) ,lastname VARCHAR(30)) SELECT cid, RELATED (lastname) FROM customer |
| 2 | DISTINCT Fields of input expression | INSERT INTO S1 SELECT DISTINCT lastname FROM customer |
| 3 | RELATED | INSERT INTO S2 SELECT lastname, RELATED (lastname) FROM S1 |
| 3A | RELATED | Using "algorithm" partition rows to buckets |
| 3B | Analysis | |
| 3C | Assignment | |
| 4 | CROSS Product | Within each bucket create cross product of rows. Records are created in pair sorted order lastname1, lastname2 where lastname1 <= lastname2. Send output to S3 |
| 5 | DISTINCT | INSERT INTO S4 SELECT lastname1, lastname2 FROM S3 |
| 6 | JOIN | Join to customer table to access required fields. INSERT INTO S5 SELECT c1.cid, c2.lastname FROM customer c1, customer c2, S4 WHERE C1.lastname = S4.lastname1 AND C2.lastname = S4.lastnam2 INSERT INTO S5 SELECT c1.cid, c2.lastname FROM customer c1, customer c2, S4 WHERE C1.lastname = S4.lastname2 AND C2.lastname = S4.lastnam1 |

Table 2 shows bi-gram frequency for top-occurring bi-grams for input data from the 1990 United States census genealogy survey. Table 3 shows the frequency of top-occurring bi-gram pairs in the same set of data. The input set for both tables contains 6.3 million census records. The last names file contains 88,799 unique last names, which represent 90 percent of the 6.3 million records. As can be seen, bi-gram pairs increase selectivity over bi-grams. For example the most frequently occurring bi-gram "er" occurs in 15,784 of the 88,799 records. This would result in a significant skew if only bi-grams where used for clustering,

TABLE 2

| Bi-gram | Frequency |
|---|---|
| er | 17.774975 |
| an | 12.218606 |
| in | 9.658893 |
| ar | 9.173527 |
| le | 8.535006 |
| en | 8.210678 |
| el | 8.111578 |
| on | 7.460670 |
| ll | 7.068773 |
| ma | 7.024854 |
| ch | 6.810887 |
| re | 6.364936 |
| la | 6.334531 |
| ra | 6.023716 |
| ne | 5.976418 |
| al | 5.623937 |
| ri | 5.613802 |
| st | 5.355916 |
| ro | 5.354790 |
| de | 5.289474 |
| li | 5.167851 |
| or | 5.099156 |
| te | 5.098031 |
| ha | 5.094652 |
| es | 4.843523 |
| he | 4.487663 |
| be | 4.364914 |
| ie | 3.974144 |

TABLE 2-continued

| Bi-gram | Frequency |
|---|---|
| se | 3.943738 |
| ck | 3.870539 |
| as | 3.848016 |
| ng | 3.840133 |
| il | 3.721889 |
| ol | 3.718510 |
| is | 3.691483 |
| ke | 3.628419 |
| ge | 3.628419 |
| lo | 3.579995 |
| to | 3.554094 |
| tt | 3.536076 |
| ic | 3.432471 |
| nd | 3.389678 |
| et | 3.299587 |
| ca | 3.282695 |
| ba | 3.274812 |
| me | 3.230892 |
| ki | 3.118278 |
| co | 3.072107 |
| ey | 3.055215 |
| ni | 3.032692 |

TABLE 3

| Bi-gram pair | Frequency |
|---|---|
| an, ma | 3.354768 |
| el, ll | 2.897555 |
| in, ng | 2.413316 |
| be, er | 2.260161 |
| er, le | 2.202728 |
| ch, sc | 2.152051 |
| er, te | 2.070969 |
| er, ge | 1.908805 |
| er, he | 1.860381 |
| in, li | 1.855877 |
| il, ll | 1.800696 |
| an, nd | 1.781552 |
| de, er | 1.770290 |
| er, ne | 1.711731 |
| an, la | 1.629523 |
| on, so | 1.607000 |
| er, in | 1.566459 |
| st, te | 1.563081 |
| ch, he | 1.522540 |
| et, tt | 1.470737 |
| ch, er | 1.460602 |
| le, ll | 1.454971 |
| an, ra | 1.431322 |
| ki, sk | 1.423440 |
| an, er | 1.422313 |
| er, me | 1.421187 |
| er, ie | 1.385151 |
| on, to | 1.373889 |
| al, ll | 1.369385 |
| er, re | 1.333348 |
| li, ll | 1.308573 |
| ck, ic | 1.306321 |
| en, er | 1.304069 |
| er, rs | 1.281546 |
| ar, ma | 1.275915 |
| ar, rd | 1.260149 |
| ar, ha | 1.246636 |
| er, ke | 1.236500 |
| in, ne | 1.229744 |
| er, ri | 1.222987 |
| ey, le | 1.191455 |
| la, ll | 1.186950 |
| er, st | 1.155418 |
| en, re | 1.153166 |
| er, rt | 1.128391 |
| in, ri | 1.111499 |
| ch, ha | 1.099111 |

TABLE 3-continued

| Bi-gram pair | Frequency |
|---|---|
| de, en | 1.095733 |
| an, ha | 1.094607 |
| ar, ri | 1.083346 |
| ne, on | 1.081093 |
| ch, ic | 1.068706 |
| er, ra | 1.060823 |
| er, se | 1.024786 |
| ar, ra | 1.020282 |
| ar, ca | 1.014651 |
| ge, ng | 1.009020 |
| ar, rt | 1.003390 |
| an, nt | 1.001137 |

Figure 10A:
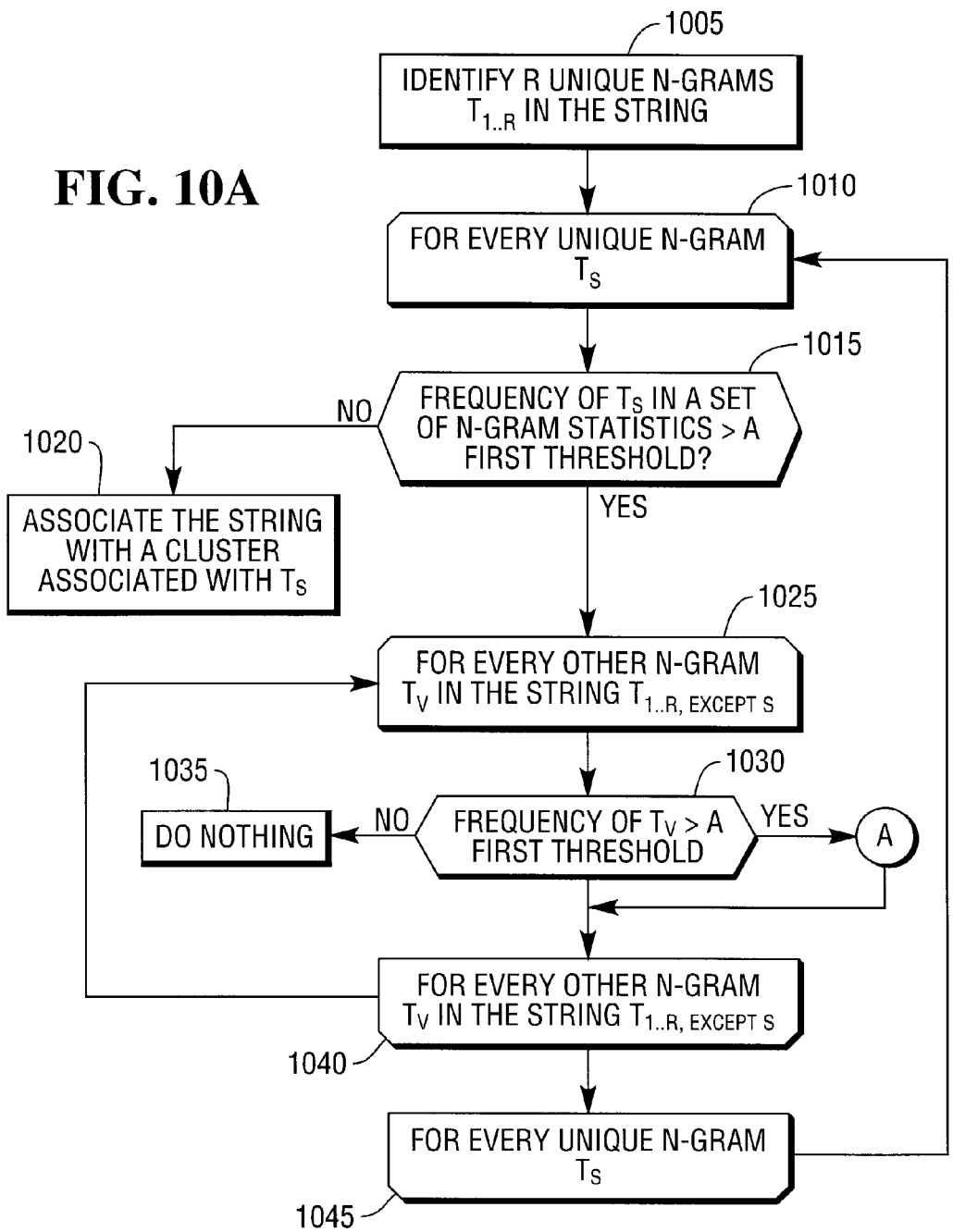
Figure 10B:
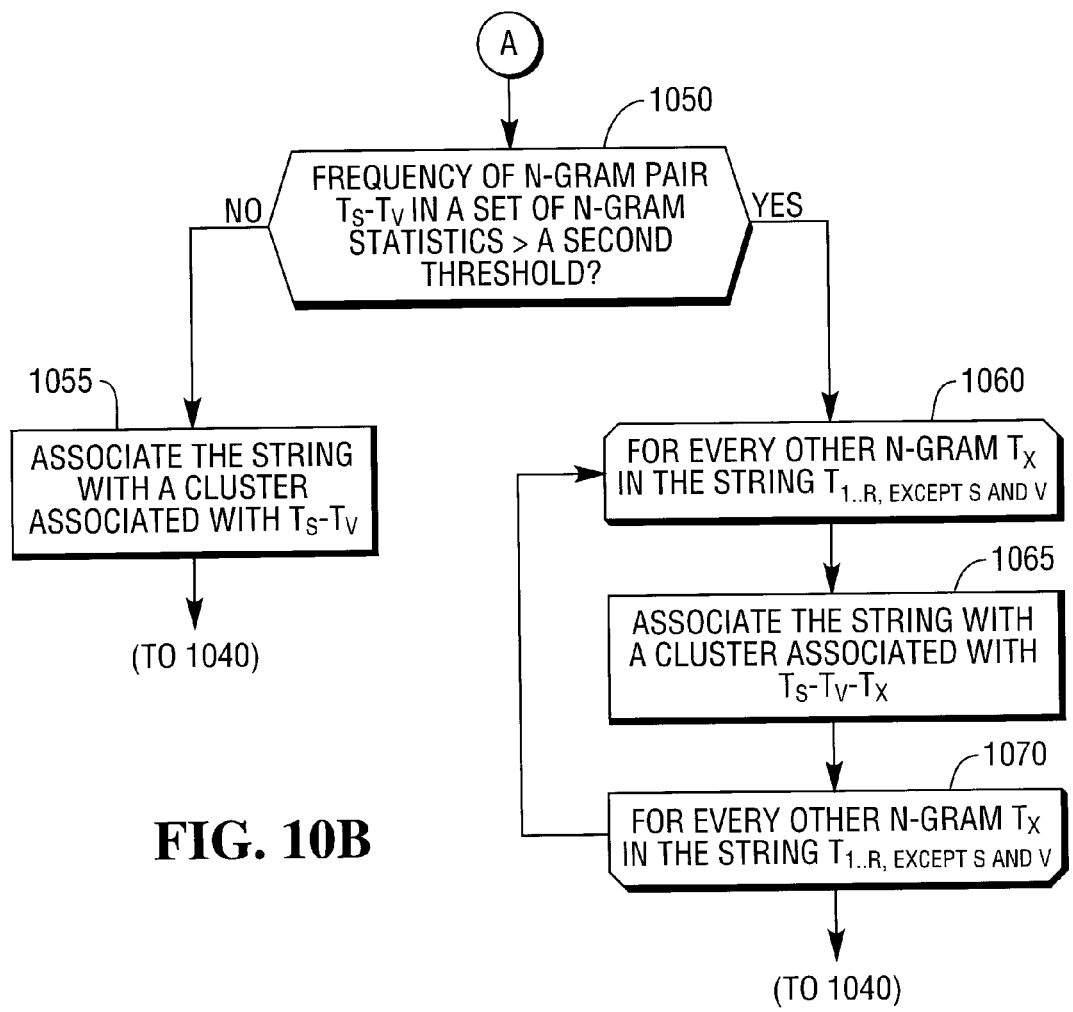

FIGS. 10A and 10B illustrate a method for clustering a string, the string including a plurality of characters, in accordance with one embodiment of the present invention. The method illustrated in FIGS. 10A and 10B includes the steps of:

identifying R unique n-grams $T_{1 \ldots R}$ in the string (step 1005);

for every unique n-gram $T_S$ (step 1010):

if the frequency of $T_S$ in a set of n-gram statistics is not greater than a first threshold (step 1015:

associating the string with a cluster associated with $T_S$ (step 1020);

otherwise:

for every other n-gram $T_V$ in the string $T_{1 \ldots R, except\ S}$ (step 1025):

if the frequency of n-gram $T_V$ is greater than the first threshold (step 1030):

if the frequency of n-gram pair $T_S$-$T_V$ is not greater than a second threshold (step 1050):

associating the string with a cluster associated with the n-gram pair $T_S$-$T_V$ (step 1055);

otherwise:

for every other n-gram $T_X$ in the string $T_{1 \ldots R, except\ S\ and\ V}$ (step 1060):

associating the string with a cluster associated with the n-gram triple $T_S$-$T_V$-$T_X$ (step 1065);

otherwise:

do nothing (step 1035).

Figure 11A:
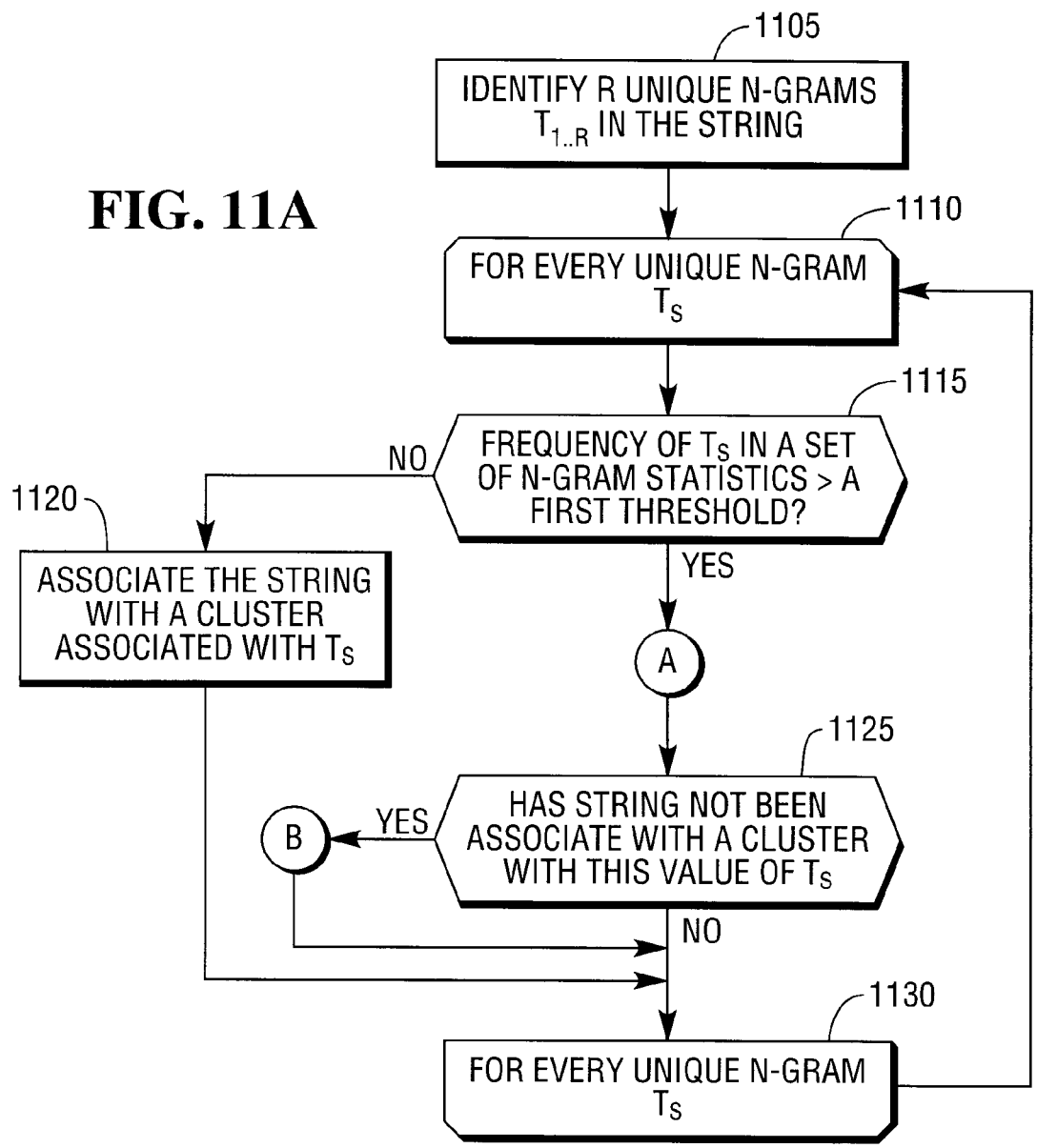
Figure 11B:
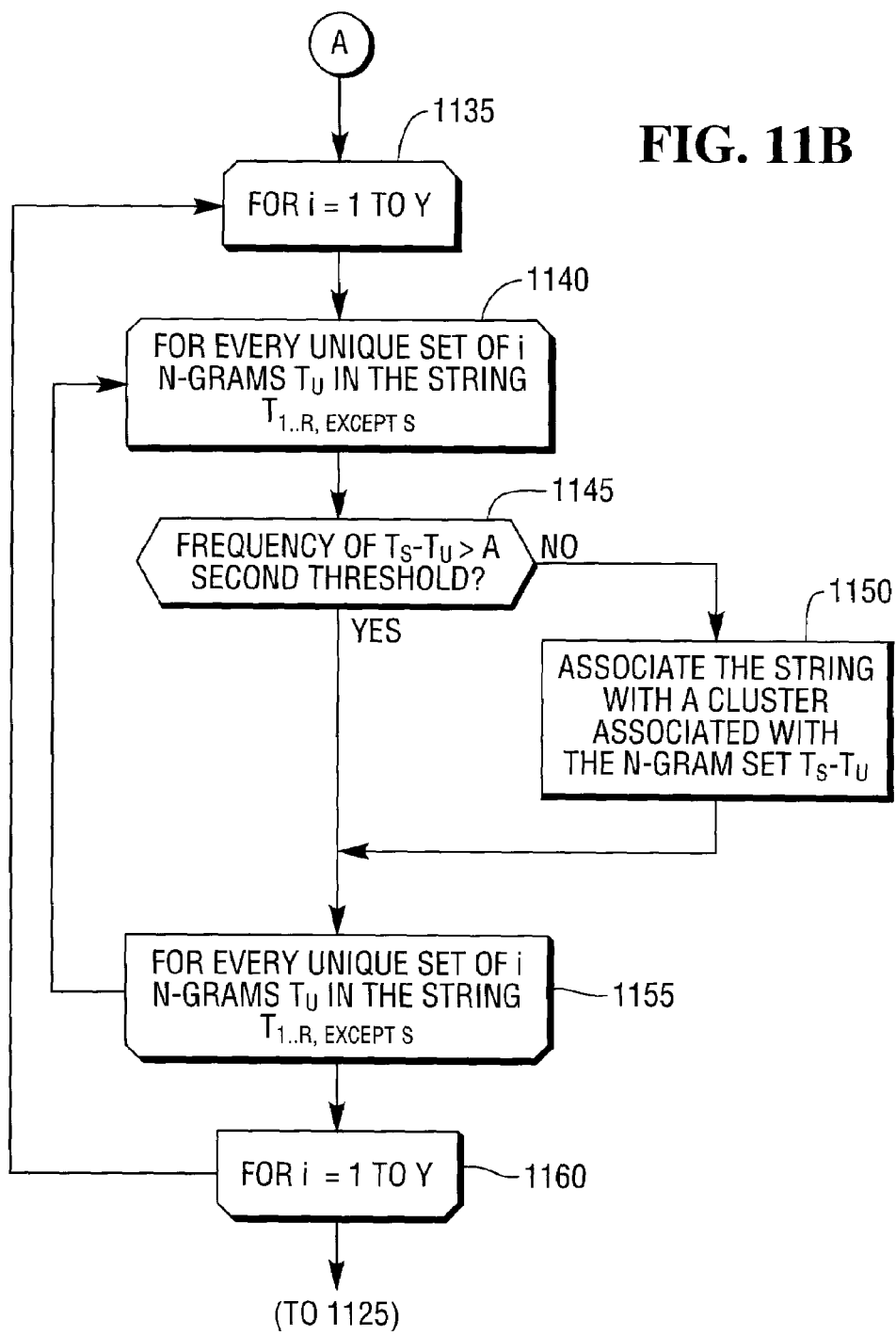

FIGS. 11A through 11C illustrate a method for clustering a string, the string including a plurality of characters, in accordance with another embodiment of the present invention. The method illustrated in FIGS. 11A through 11C includes the steps of:

identifying R unique n-grams $T_{1 \ldots R}$ in the string (step 1105);

for every unique n-gram $T_S$ (step 1110):

if the frequency of $T_S$ in a set of n-gram statistics is not greater than a first threshold (step 1115):

associating the string with a cluster associated with $T_S$ (step 1120);

otherwise:

for i=1 to Y (step 1135):

for every unique set of i n-grams $T_U$ in the string $T_{1 \ldots R, except\ S}$ (step 1140):

if the frequency of the n-gram set $T_S$-$T_U$ is not greater than a second threshold (step 1145):

associating the string with a cluster associated with the n-gram set $T_S$-$T_U$ (step 1150);

if the string has not been associated with a cluster with this value of $T_S$ (step 1125):

for every unique set of Y+1 n-grams $T_{UY}$ in the string $T_{1...R, except S}$ (step 1165):

associating the string with a cluster associated with the Y+2 n-gram group $T_S$-$T_{UY}$ (step 1170).

The text above describes one or more specific embodiments of a broader invention. The invention also is carried out in a variety of alternate embodiments and thus is not limited to those described here. For example, as mentioned above, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method implemented in a computer system said computer system having a memory and processor, for clustering a string, the string including a plurality of characters, the method including:

identifying R unique n-grams $T_{1...R}$ in the string;

for every unique n-gram $T_S$:

if the frequency of $T_S$ in a set of n-gram statistics is not greater than a first threshold:

clustering the string with a cluster associated with $T_S$;

otherwise:

for every other n-gram $T_V$ in the string $T_{1...R, except S}$:

concluding that the frequency of n-gram $T_V$ is greater than the first threshold, and in response:

if the frequency of n-gram pair $T_S$-$T_V$ is not greater than a second threshold:

clustering the string with a cluster associated with the n-gram pair $T_S$-$T_V$;

otherwise:

for every other n-gram $T_X$ in the string $T_{1...R, except S and V}$:

clustering the string with a cluster associated with the n-gram triple $T_S$-$T_V$-$T_X$;

where $T_{1...R}$ is a set of n-grams, R is the number of elements in $T_{1...R}$, and $T_S$, $T_V$, and $T_X$ are members of $T_{1...R}$, and S, V, and X are integer indexes to identify members of $T_{1...R}$.

2. The method of claim 1 further including compiling n-gram statistics.

3. The method of claim 1 further including compiling n-gram pair statistics.

4. A method implemented in a computer system said computer system having a memory and processor, for clustering a string, the string including a plurality of characters, the method including:

identifying R unique n-grams $T_{1...R}$ in the string;

for every unique n-gram $T_S$:

if the frequency of $T_S$ in a set of n-gram statistics is not greater than a first threshold:

clustering the string with a cluster associated with $T_S$;

otherwise:

for i=1 to Y:

for every unique set of i n-grams $T_U$ in the string $T_{1...R, except S}$:

if the frequency of the n-gram set $T_S$-$T_U$ is not greater than a second threshold:

clustering the string with a cluster associated with the n-gram set $T_S$-$T_U$;

if the string has not been associated with a cluster with this value of $T_S$:

for every unique set of Y+1 n-grams $T_{UY}$ in the string $T_{1...R, except S}$:

clustering the string with a cluster associated with the Y+2 n-gram group $T_S$-$T_{UY}$, where $T_{1...R}$ is a set of n-grams, R is the number of elements in $T_{1...R}$, and $T_S$, $T_V$, and $T_X$ are members of $T_{1...R}$, and S, V, and X are integer indexes to identify members of $T_{1...R}$.

5. The method of claim 4 where Y=1.

6. The method of claim 4 further including compiling n-gram statistics.

7. The method of claim 4 further including compiling n-gram group statistics.

* * * * *